(12) United States Patent
Lutterschmidt

(10) Patent No.: US 6,356,947 B1
(45) Date of Patent: Mar. 12, 2002

(54) DATA DELIVERY SYSTEM

(75) Inventor: Karl-Heinz Lutterschmidt, Vienna (AT)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/252,982

(22) Filed: Feb. 19, 1999

(30) Foreign Application Priority Data

Feb. 20, 1998 (DE) .......................... 198 07 076

(51) Int. Cl.⁷ .............................................. G06F 15/16
(52) U.S. Cl. .................................................... 709/231
(58) Field of Search ................................ 709/220, 223, 709/227, 230, 231

(56) References Cited

U.S. PATENT DOCUMENTS

| | | | |
|---|---|---|---|
| 5,630,007 A | | 5/1997 | Kobayashi et al. ......... 386/113 |
| 5,748,892 A | * | 5/1998 | Richardson ................ 709/200 |
| 5,941,999 A | * | 8/1999 | Matena et al. ......... 714/714.06 |
| 5,988,847 A | * | 11/1999 | McLaughlin et al. .......... 700/9 |
| 6,049,808 A | * | 4/2000 | Talluri et al. .............. 707/201 |
| 6,067,545 A | * | 5/2000 | Wolf ......................... 707/10 |

FOREIGN PATENT DOCUMENTS

| | | |
|---|---|---|
| DE | 195 14 616 A1 | 10/1995 |
| EP | 0 696 872 A2 | 2/1996 |
| EP | 0 740 470 A2 | 10/1996 |
| EP | 0 746 158 A2 | 12/1996 |
| EP | 0 767 585 A2 | 4/1997 |
| WO | WO 93/18598 | 9/1993 |

OTHER PUBLICATIONS

M. M. Buddhikot et al, "Design of a large scale multimedia storage server", Computer Networks and ISDN Systems, Dec. 1, 1994, pp. 503–517 XP004037983.
Wu, Tsong–Ho, et al.: "Distributed Interactive Video System Design and Analysis" IEEE Communications Magazine, Mar. 1997, pp. 100–108.
R. Heidemann, "The IVOD Berlin Project: Access Technology for Service Provisioning", Alcatel Telecommunications Review, 3$^{rd}$ Quarter 1996, pp. 196–200.

* cited by examiner

Primary Examiner—David Y. Eng
(74) Attorney, Agent, or Firm—Sughrue, Mion, PLLC

(57) ABSTRACT

A method and system for supplying client nodes (C1 to C4) with data streams with different content, whereby a plurality of client nodes (C1 to C4) are supplied with data streams of different content. Data sets with the different content are stored in two or more data server nodes (SS1 to SS4), which can be connected by means of a first communication network (KN2) with the plurality of client nodes (C1 to C4). These data server nodes (SS1 to SS4) are also continuously monitored by a central server node (AS), which thereby receives status data on the utilization of capacity and the content of the data sets stored in the data server nodes (SS1 to SS4). To request a data stream with a specified content, a client node (C1) sends a request message to the central server node (AS). The central server node (AS) dynamically assigns to the requesting client node (C1), by means of an evaluation of the status data, one of the data server nodes (SS1), in which a data set with the specified content is stored. The assigned data server node (SS1) then sends the requested data stream to the requesting client node (C1).

13 Claims, 3 Drawing Sheets

DATA DELIVERY SYSTEM

BACKGROUND OF THE INVENTION

This application is based on and claims the benefit of German Patent Application No. 198 07 076.4 filed Feb. 20, 1998, which is incorporated by reference herein.

This invention relates to a method to supply client nodes with data streams as described in the introductory portion of claim 1, a method to support the supply of client nodes with data streams as described in the introductory portion of claim 9, a data delivery system as described in the introductory portion of claim 10, and a central server node as described in the introductory portion of claim 11.

The invention is based on a video-on-demand system of the type, by way of example, that is described in EP 0696872 A2.

Such a video-on-demand system consists of a video server node which is connected by means of a communications network with a plurality of client nodes. A client node is formed by a set-top box which is connected to a television set. The video server node has a memory in which video data sets containing various content, for example different films, are stored. The video server node also has a plurality of video playback devices that play back these video sets and send the stream of video thus generated to a requesting client. The video server node also has a control unit which assigns a video playback device to a requesting client and initiates the transmission of the video data stream from the assigned video playback device to the client node. The assignment is thereby made with the objective of sending a video data stream in parallel to as many client nodes as possible.

If a client node requests the playback of a video data set with a specified content, in particular the playback of a specified video film, then it is possible that the video server node may not be able to successfully assign a playback unit. Such a situation can occur, for example, if sufficient resources are no longer available in the video server node. It is also possible that the requested video film is not even stored in the memory of the video server node, and that therefore the video server node cannot supply the requested video film. It is also possible that the entire connection capacity of the video server node is already being utilized by other client nodes, and therefore no further access to the video server nodes is possible.

SUMMARY OF THE INVENTION

The object of the invention is to improve the supply of client nodes with data streams of different content.

The invention teaches a method to supply client nodes with data streams as described in the characterizing portion of claim 1, a method to support the supply of client nodes with data streams as described in the characterizing portion of claim 9, a data delivery system as described in the characterizing portion of claim 10, and a central server node as described in the characterizing portion of claim 11.

The invention is based on the teaching that the client servers share a set of a plurality of data server nodes that are connected to the client nodes by means of a communications network. A central server node monitors these data server nodes and, by means of the data obtained, performs a dynamic assignment of client nodes to data server nodes.

The data sets, which are played back by a data server node and are sent in the form of a data stream to a client node, thereby generally contain "stream" data such as video, audio or multimedia files, i.e. files that are sent in real time at a constant transmission rate to the client nodes.

The advantage of the invention is that a client node thereby obtains transparent access to the content and resources of a plurality of data server nodes. A client node can thereby have transparent access to a larger number of contents with a lower probability of rejection. As a result of the geographically distributed structure of the data server nodes, it is also possible to achieve a more uniform utilization of capacity of the communications network that transmits the data from the data server nodes to the client nodes. The architecture claimed by the invention therefore has the following advantages over the potential use of a very efficient central data server node: The risk of a spot overload of the communications network is reduced. The length of the connecting lines and thus the resources of the communications network occupied are reduced. The likelihood of failure of the data delivery system is reduced.

Above all, a data delivery system as claimed by the invention has advantages when a large number of client nodes are required to have access to a large number of different contents. Such a system is difficult to realize using the solutions of the prior art.

Advantageous configurations of the invention are described in the subclaims.

It is thereby advantageous above all that the central server nodes also centrally manage the distribution of the contents to the data server nodes. A further optimization of the data delivery system is thereby possible, and the quality of service of the data delivery system and the resources required by it are further reduced.

BRIEF DESCRIPTION OF THE DRAWING

The invention is explained in greater detail below with reference to the exemplary embodiment illustrated in the accompanying drawings.

DETAILED DESCRIPTION OF THE INVENTION

Figure 1:
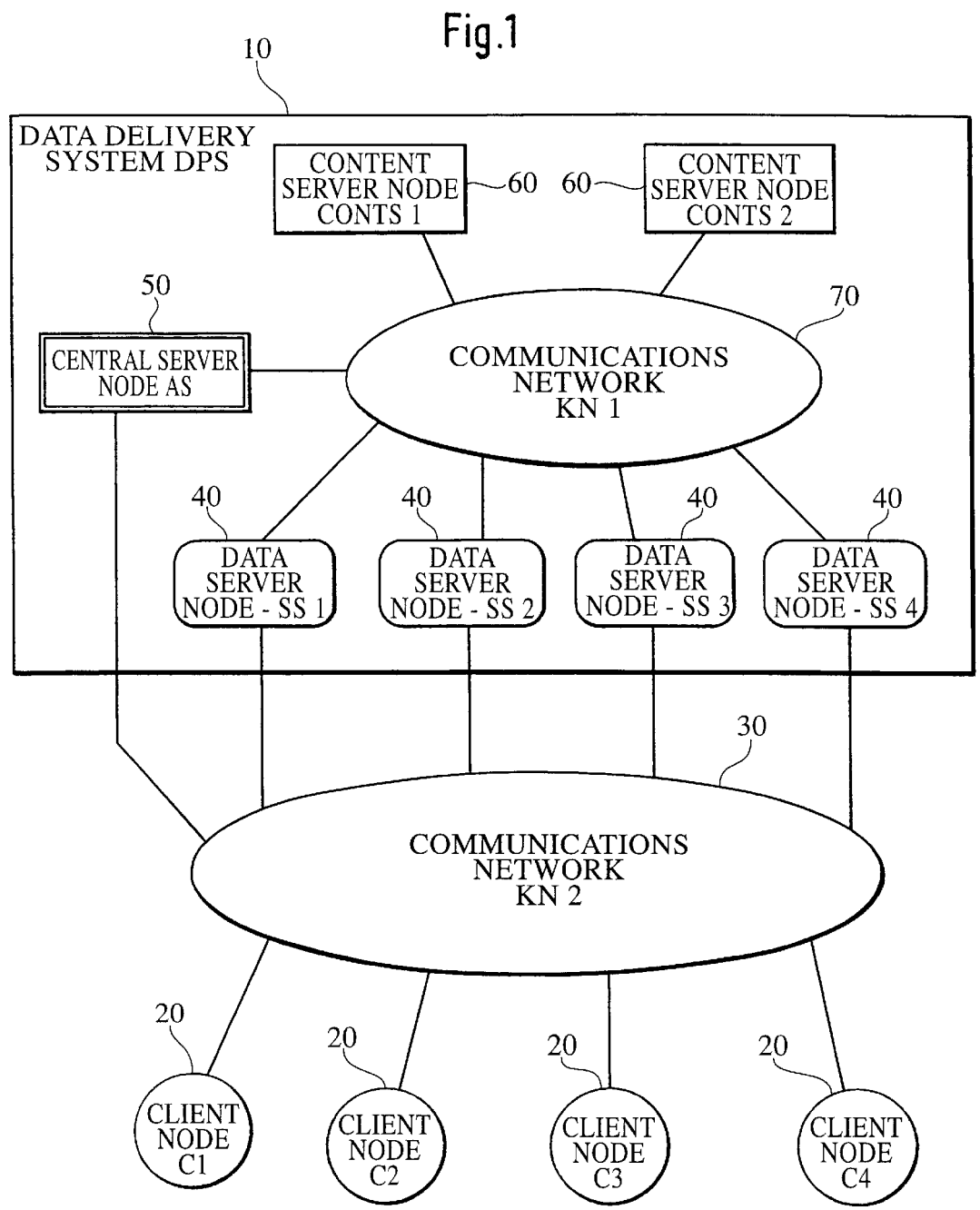
FIG. 1 is a block diagram of a communications system with a data delivery system as claimed by the invention.

FIG. 1 shows a data delivery system DPS 10, four client nodes C1–C4 (20) and a communications network KN2 30, by means of which the client nodes C1 to C4 (20) are connected with the data delivery system DPS 10.

The number of client nodes C1 to C4 has been selected by way of example. The client nodes C1 to C4 are each a video player unit, e.g. a television set, that is equipped with a set-top box to access the data delivery system DPS. Such a client node and a corresponding communications network is described by way of example in the article entitled "Das IVOD-Projekt Berlin: Anschlußtechnologie zur Bereitstellung von Diensten" [The Berlin IVOD Project: Connection Technology for Delivery of Services], R. Heidemann, Alcatel Telecom Rundschau, 3. Quartal 1996, pages 196 to 200.

It is also possible, however, that the client nodes C1 to C4 can each be a computer station that has access via peripheral components for communications via the communications network KN2 and for the output of the content delivered by the data delivery system DPS. The client nodes C1 to C4, for example, can be network computers, personal computers or data terminals.

The communications network KN2 consists of an access network, via which the client nodes C1 to C4 are connected by means of hybrid fiber coax, cable modems, ISDN (Integrated Services Digital Network) or by means of ADSL (Asymmetrical Digital Subscriber Line). In particular if a rather large number of client nodes are connected to the communication network KN2, it is hereby advantageous that the communications network KN2 has a plurality of access networks, and under some conditions different types of access networks, as well as a backbone network that connects the access networks to one another and to the data delivery system DPS. An ATM (Asymmetrical Transfer Mode) or an Synchronous Digital Hierarchy) network, for example can be used as the backbone network.

It is also possible that the client nodes can be connected to the communications network KN2 directly via an ATM interface. If the client node in question is a computer station, it is also advantageous if the communications network KN2 is an IP network (IP=Internet Protocol), for example a Fast Internet.

The data delivery system DPS 10 has four data server nodes SS1 to SS4 (40), a central server node AS 50, two content server nodes CONTS1 and CONTS2 (60) and a communications network KN1 70. The data server nodes SS1 to SS4 (40), the central server node AS 50 and the content server nodes CONST1 and CONST2 (60) are connected to one another via the communications network KN1 70.

The communications network KN1 is a broad-band data network, for example an ATM, FDDI or DQDB (FDDI= Fiber Distributed Data Interface, DQDB=Distributed Queue Dual Bus).

The data server nodes SS1 to SS4, the central server node AS and the content server nodes CONTS1 and CONTS2 are each formed by specially configured computer stations. The number of data server nodes and content server nodes illustrated in FIG. 1 were selected merely by way of example.

Stored data sets with different content are distributed via the data server nodes SS1 to SS4. In each of the data server nodes SS1 to SS4, one or more of these data sets are stored, whereby data sets with the same content can be stored in parallel in different data server nodes. On request, the data server nodes SS1 to SS4 reproduce the data set stored in them, and transmit the data to be played back to a client node in the form of a data stream.

A data set in this case consists of the video data that describe a specified content, for example the video data of a special video film. It is also possible, however, that a data set can comprise multimedia data, audio data or other data that are transmitted to the subscriber by the client nodes essentially synchronously via a corresponding output device.

In the content server nodes CONTS1 and CONTS2, a plurality of data sets with different contents are stored, each of which can be downloaded individually on request via the communications network KN1 into one of the data server nodes SS1 to SS4.

The central server node AS controls the assignment between the client node and the respective data server nodes. It determines which of the data server nodes SS1 to SS4 serves which of the client nodes C1 to C4. It also controls the distribution of contents to the data server nodes SS1 to SS4.

It is possible that the data server nodes SS1 to SS4 and the central server node AS can communicate with one another over the communications network KN2.

It is also possible to do without the content server nodes CONTS1 and CONTS2. Data sets could also be loaded into the data server nodes SS1 to SS4 directly, e.g. by means of a video tape recorder.

Figure 2:
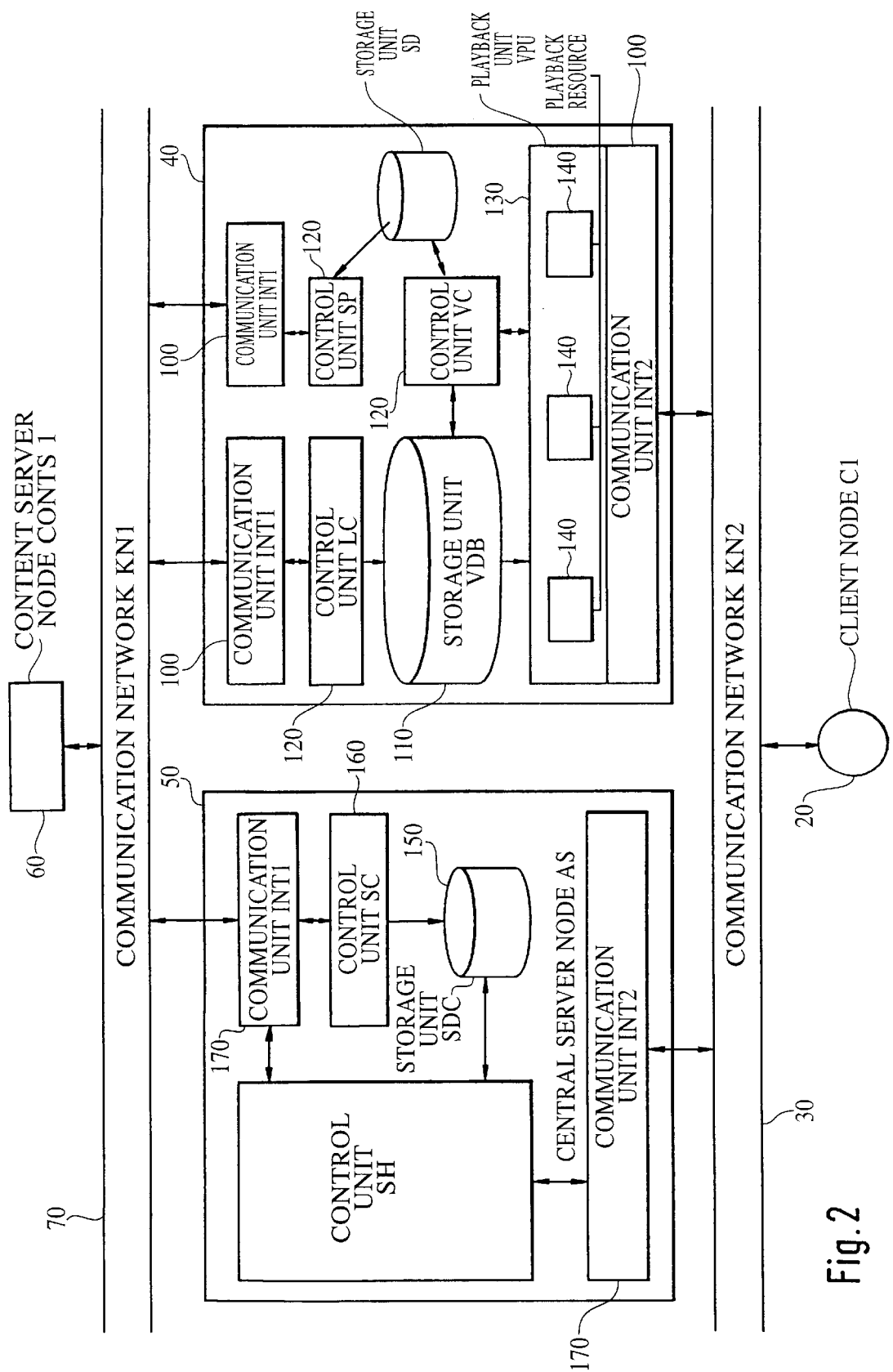
FIG. 2 is a functional illustration of a portion of the data delivery system as claimed by the invention and illustrated in FIG. 3.

The following portion of the description discloses the detailed operation of the data server nodes SS1 to SS4 and to the central server AS 50 illustrated in FIG. 2.

FIG. 2 shows the communication networks KN1 70 and KN2 30, the central server node AS 50 and, by way of example, the data server node SS1 (40), the content server nodes CONTS1 (60) and the client node C1 (20).

The data server node SS1 has three communication units INT1, INT' and INT2 (100), two storage units VDB and SD (110), three control units LC, VC and SP (120), and one playback unit VPU 130.

The communications units INT1, INT1' and INT2 are formed by the communications modules and protocol stacks that form the connection between the data server node SS1 and the communications networks KN1 or KN2.

The storage unit VDB preferably consists of a plurality of hard drives and buffer memories, and is suitable for the storage of large quantities of data. The data sets stored in the data server node are stored in the storage unit VDB.

The playback unit VPU 130 has a plurality of playback resources PR 140. A playback resource PR 140, when it is activated, accesses the storage unit VDB (110), reproduces a data set stored there, and sends the resulting continuous data stream via the communications unit INT2 (100) and the communications network KN2 30 to one or simultaneously to a plurality of client nodes C1 to C4 (20). During the playback of the data set and the transmission of the resulting data stream, the playback resource PR 140 also occupies resources of the storage unit VDB (110) and of the communication unit INT2 (100).

The storage unit SD is designed to store a smaller quantity of data, and preferably represents a file from the computer system on which the data server node SS1 is based. The storage unit SD stores status data on the data server node SS1. Such status data include the content of the data sets stored in the storage unit VDB and the utilization of capacity of the data server node SS1.

It is thereby advantageous to store status data on the utilization of capacity of the resources of the storage unit VDB, the playback resources PR and the resources of the communications unit INT1. The content of the data set, the playback of which occupies one of these resources, and the expected duration of such occupation can also be stored as status data.

The control unit VC determines which if the resources of the storage unit VDB, of the playback unit VPU and of the communications unit INT2 are assigned to a corresponding client node, and initiates the playback of the content requested by this client node. The assignment is thereby made from the point of view of optimization of resources. The control unit VC also notes any changes in the utilization of resources, as well as any change in the contents (status data) of the storage unit SD or the contents stored in the storage unit VDB.

In response to a request from the central server node AS, the control unit SP transmits the status data stored in the storage unit SD to the central server node AS. The request message and the status data are thereby exchanged over the communications network INT1 and the communications network KN1.

It is also possible that the control unit SP can transmit only some of the status data, depending on the parameters of the request message.

It is also possible that the control unit SP can transmit the status data to the central server node AS regularly, or when there is a change in the status data. In the latter case, only the status data that have changed can be transmitted.

The control unit LC controls the downloading of data sets stored in the content server nodes CONST1 and CONST2 into the storage unit VDB. Upon receipt of a control message from the central server node AS, it sends a request message to one of the content server nodes, which requests the content server node to load a data set with a specific content into the data server node SS1. This content is specified by the control message received. The data set is then received via the communication network KN1 and the communication unit INT1', and is then stored by the control unit LC in the storage unit VDB. Because this downloading process takes place via the broad-band data network KN1, the loading process takes only a short time, compared to the playback time of the data set through the playback unit VPU.

The central server node AS 50 has a storage unit SDC 150, two control units SH and SC (160), and two communications units INT1 and INT2 (170).

The storage unit SDC is formed by a data base or a file in the computer system on which the central server node AS is based. The status data on the data server node SS1 and the corresponding status data on the other data server nodes SS2 to SS4 are stored in the storage unit SDC.

The status data stored in the storage unit SDC are continuously updated by the control unit SC. For this purpose, the control unit SC continuously monitors the data server nodes SS1 to SS4, by regularly sending request messages to the data server nodes for the transmission of status data. It is also possible that it can continuously monitor the data server nodes SS1 to SS4, in which case the data server nodes SS1 to SS4 can themselves regularly send the control unit SC status data, or only when special events (change in the status data) occur.

The control unit SH controls the dynamic assignment of data server nodes to the requesting client nodes and manages the distribution of the contents to the data server nodes SS1 to SS4. The assignment is dynamic, to the extent that it is a function of the current status of the data delivery system DPS. The management of the distribution of the content via the control unit SH is advantageous, but not mandatory, for the operation of the data delivery system DPS.

If the control unit SH receives a request message from one of the client nodes C1 to C4, which requests a data stream with a specific content, it performs the following steps:

By means of the status data stored in the storage unit SDC it determines in which of the data server nodes SS1 to SS4 a data set with the specific content is stored. From this first group of data server nodes, it then determines the data server nodes that have sufficient available resources for the playback and transmission of the data set. From this second group of data server nodes, it then selects the one in which the fewest resources are occupied during the playback and transmission of the data set. That is the case, for example, if in this data server node, the playback and transmission of the data set to another client node has recently been started, or if a corresponding assignment has recently been made.

Another additional or alternative selection criterion consists of selecting from the second group of data server nodes, the one that has the most available resources. It thereby becomes possible to achieve a uniform utilization of the resources of the data server nodes.

The projected occupation time of the currently occupied resources can also be used as a criterion.

It is also advantageous to take into consideration, as an additional or alternative selection criterion, the communications parameters of the communications connections between the data server nodes of the second group and the requesting client node. Such communications parameters can include, for example, the length of the communications connections, the costs calculated by network operators, the bandwidth available, the guaranteed transmission quality, or the change in the network utilization resulting from their occupation.

Via the status data stored in the storage unit SDC, the control unit SH also manages the distribution of the content via the data server nodes SS1 to SS2. If it does not find any data server nodes that meet the criteria of the first or the second group defined above, the control unit SH selects one or more data server nodes and, by sending a corresponding control message to the selected data server node or nodes, initiates the downloading of the data set with the desired content into the data server node or nodes.

To make the selections, the control unit SH accesses the status data stored in the storage unit SDC. It selects a third group of data server nodes, those data server nodes that have sufficient available resources of the storage unit VDB for the storage of a data set with the requested content. From this group, it selects the data server node that has overall the most available resources.

It is also possible that instead of this criterion or in addition to this criterion, the following additional criteria can be used to make this selection: The communications parameters of the communications connections between the data server node and the requesting client nodes are taken into consideration. The static distribution of the requesting client nodes is taken into consideration with the objective of an overall optimization of resources.

If none of the data server nodes SS1 to SS4 meets the criterion of the third group, the control unit SH causes the selected data server node, during the downloading of the data set with the requested content, to overwrite a data set stored in the storage unit VDB. In this case, the control unit SH first selects a data set that is to be overwritten, because the content of this data set is not frequently requested by client nodes, in comparison to the number of the copies of this data set stored in the data server nodes SS1 to SS4. Then the data server node is selected in which this selected data set is stored. From this fourth group, analogous to the selection process described above, the data server node is selected in which a data set with the requested content is to be loaded.

Figure 3:
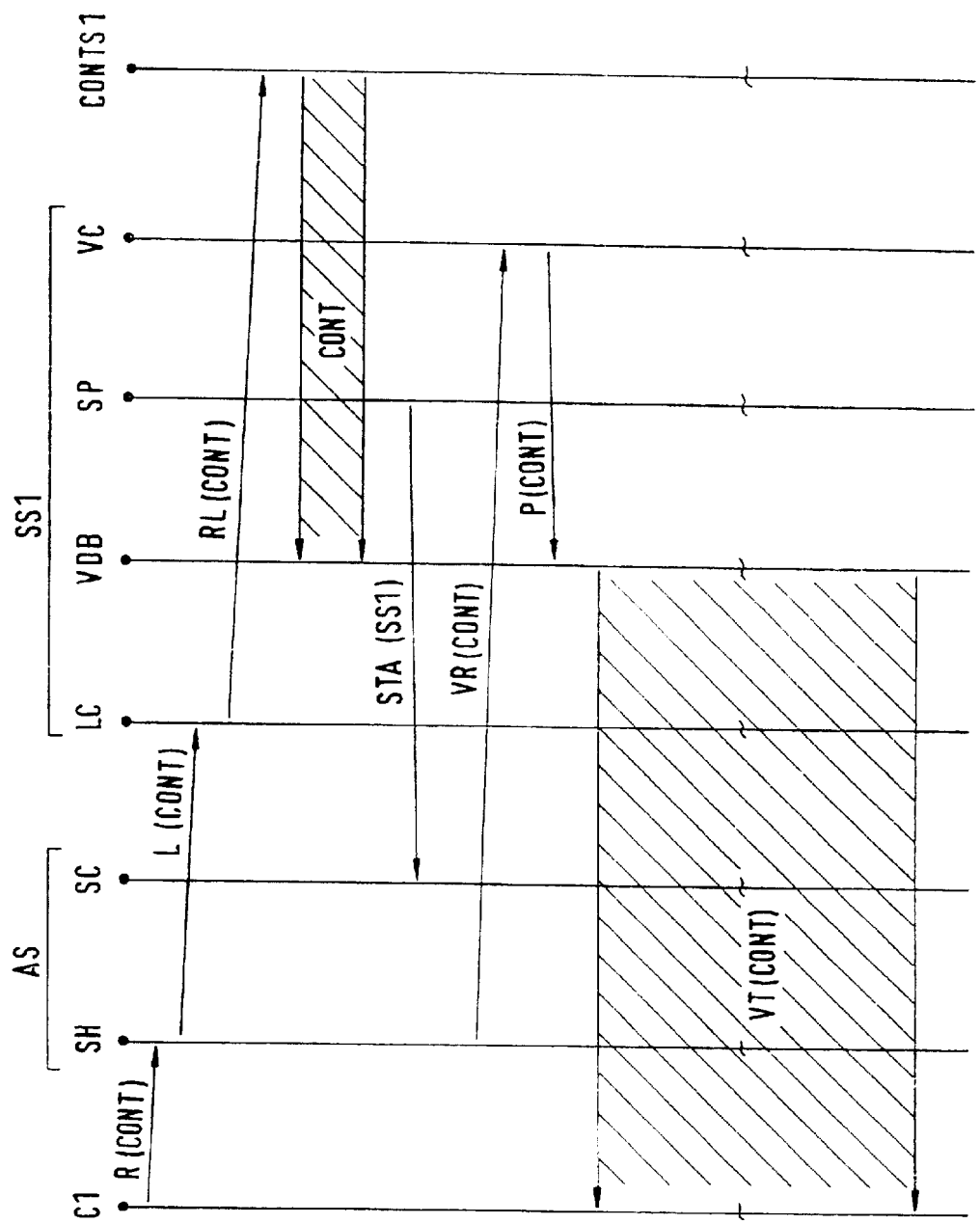
FIG. 3 is a flow chart of the exchange of information in the data delivery system illustrated in FIG. 1.

FIG. 3 illustrates, exclusively by way of example, the sequence of events that occur in the method that begins with the request for a data set with a specified content.

FIG. 3 shows the client node C1, the central server node AS with the control units SH and SC, the data server node SS1, the content server node CONTS1 and a plurality of messages R(CONT), L(CONT), RL(CONT), CONT, STA (SS1), VR(CONT) and P(CONT) as well as the data stream VT(CONT) that are plotted over time.

The client node C1 sends a message R(CONT), which is transmitted by the communications network KN2 to the central server node AS. By means of the message R(CONT), the client node C1 thereby requests that it be supplied with a data stream with a specified content.

In the central server node AS, the control unit SH processes the message R(CONT) and according to the method described above, selects the data server node SS1, for example.

Because the specified content has not yet been stored in the data server node SS1, the control unit SH sends a message L(CONT) to the data server node SS1, by means of which it requests the latter to download a data set with the specified content. The control unit LC processes the message L(CONT) and sends a message RL(CONT) to the content server node CONTS1, which then sends the data set with the content specified in the message CONT via the communications network KN2 to the data server node SS1, where the data set is stored in the storage unit VDB. As a result, the status data stored in the storage unit SP are changed. The new status data are then sent by the control unit SP with the message STA(SS1) to the central server node AS, where they are stored by the control unit SC in the control unit SDC.

The control unit SH, on the basis of the changes in the status data in the storage unit SDC, recognizes that the data server node SS1 has only one data set with the specified content, and then assigns the data server node SS1 to the requesting client node C1. It is also possible that the control unit SH does not wait for the feedback concerning the downloading of this data set, and makes this assignment immediately after the selection process.

Once the assignment is made, the control unit SH sends the message VR(CONT) to the data server node SS1, which is the assigned data server node. With this message, it requests the data server node to transfer data with the specified content to the client node C1. It is also possible that the control unit SH informs the assigned data server node, and the client node then sends the message VR(CONT) to this assigned data server node.

Upon receipt of the message VR(CONT), the control unit VC then identifies the resources required for its execution, and sends the message P(CONT) to the playback device VPU, whereupon the playback device plays back the data set with the specified content stored in the storage unit VDB and sends VT(CONT) in the form of a continuous data stream to the client node C1.

What is claimed is:

1. A method for supplying client nodes with data streams having different content, including:
   storing data sets with the different content in two or more data server nodes connected through a first communications network with a plurality of client nodes;
   continuously monitoring the data server nodes by a central server node to detect status data on the utilization of capacity of the data server nodes and the content of the data sets stored in the data server nodes;
   requesting a data stream with a specified content by one of the plurality of client nodes, in the form of a request message to the central server node;
   evaluating the status data by the central server node;
   dynamically assigning to the requesting client node one of the data server nodes in which a data set with the specified content is stored by the central server node; and
   reproducing the data set with the specified content in the assigned data server node and transmitting the resulting data stream to the requesting client node.

2. A method as claimed in claim 1, wherein the content of the data sets include video data.

3. A method as claimed in claim 1, further including:
   assigning one of the data server nodes to the requesting client node by the central server node on the basis of communications parameters of communications connections between the data server nodes and the requesting client node in addition to content.

4. A method as claimed in claim 1, further including:
   determining by the central server node the assigning of which data server node occupies the fewest resources; and
   assigning that data server node on that basis, in addition to content.

5. A method as claimed in claim 1, further including:
   determining by the central server node which content is to be stored in which data server node based on the status data detected.

6. A method as claimed in claim 1, further including:
   controlling downloading of data sets from one or more content server nodes into the data server nodes by the central server node.

7. A method as claimed in claim 1, further including:
   downloading data sets into the data server nodes via a second communications network.

8. A method as claimed in claim 7, wherein the first communications network is formed by an access network, and the second communications network is formed by a broad-band communications network.

9. A method to support the supply of client nodes with data streams of different content, including:
   continuously monitoring by a central server node two or more data server nodes in which data sets of various content are stored, the data server nodes connected with the client nodes via a first communications network;
   detecting status data on the utilization of capacity of the data server nodes and the content of the data sets stored in the data server nodes;
   detecting a request message from a client node by the central server node, the request message including a request for a data stream with a specified content;
   evaluating by the central server node the status data corresponding to one of the data server nodes in which a data set having the specified content is determined to be stored;
   dynamically assigning to the requesting client node on the basis of the evaluation by the central server node one of the data server nodes in which the data set having the specified content is stored;
   reproducing the data set having the specified content in the assigned data server node to produce the requested data stream; and
   directing the assigned data server node to send the requested data stream to the requesting client node.

10. A data delivery for the supply of client nodes with data streams of different content, comprising:
   two or more data server nodes connected via a first communication network with the client nodes;
   a storage unit for the storage of data sets of various content;
   a playback unit to play back stored data sets and to send a resulting data stream to the client nodes
   a central server node further including a monitoring unit and an assignment unit,
   wherein the monitoring unit is operable to continuously monitor the data server nodes and receive status data relating to the utilization of capacity of the data server nodes and the content of the data sets stored in the data server nodes, and wherein the assignment unit is operable to receive a request message requesting a data set with a specified content from a requesting client node, and is operable to dynamically assign to the requesting client node one of the data server nodes in which a data set with the specified content is stored, on the basis of an evaluation by the assignment unit of the status data received by the monitoring unit.

11. A central server node to support the supply of client nodes with data streams having different content, comprising:

a monitoring unit operable to continuously monitor two or more data server nodes connected by a first communication network with the client nodes and operable to receive status data on the utilization of capacity of the data server nodes and the content of the data sets stored in the data server nodes through the first communication network; and an assignment unit operable to receive a request message requesting a data stream with a specified content from a requesting one of the client nodes, and operable to dynamically assign to the requesting client node on the basis of an evaluation of the status data, one of the data server nodes in which a data set with the specified content is stored.

12. A multimedia data delivery system operable to provide a plurality of client nodes of the delivery system with a variety of content, the system comprising:

a central server node;

a plurality of content server nodes;

a plurality of data server nodes;

a first network interconnecting the plurality of data server nodes, the plurality of client nodes and the central server node;

a second network interconnecting the plurality of content server nodes, the plurality of data server nodes and the central server nodes;

the central server node operable to store content from the content server nodes in the data server nodes;

the assigned data server node operable to reproduce the specific content and transmit this reproduced content in a data stream to the specific client node.

13. The multimedia data delivery system of claim 12, wherein each of the plurality of data server nodes further includes at least one storage unit for storing content from the content server nodes, and a playback unit for reproducing the content from the content server nodes to produce a resulting data stream for transmission to one of the client nodes.

* * * * *